(12) United States Patent
Gilbert

(10) Patent No.: US 10,038,829 B2
(45) Date of Patent: Jul. 31, 2018

(54) ELECTRONIC DEVICE MOUNT

(71) Applicant: Netgear, Inc., San Jose, CA (US)

(72) Inventor: William Gilbert, Carlsbad, CA (US)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 15/294,924

(22) Filed: Oct. 17, 2016

(65) Prior Publication Data

US 2018/0109704 A1   Apr. 19, 2018

(51) Int. Cl.
| | |
|---|---|
| *H04N 5/225* | (2006.01) |
| *H04N 5/232* | (2006.01) |
| *G03B 17/56* | (2006.01) |
| *F16M 13/02* | (2006.01) |
| *F16M 11/14* | (2006.01) |
| *F16M 11/20* | (2006.01) |

(52) U.S. Cl.
CPC ........... *H04N 5/2253* (2013.01); *F16M 11/14* (2013.01); *F16M 11/2078* (2013.01); *F16M 13/02* (2013.01); *G03B 17/561* (2013.01); *H04N 5/2252* (2013.01); *H04N 5/23206* (2013.01); *F16M 2200/022* (2013.01)

(58) Field of Classification Search
None
See application file for complete search history.

(56) References Cited

U.S. PATENT DOCUMENTS

| | | | | |
|---|---|---|---|---|
| 1,800,797 | A * | 4/1931 | Hoople | F16M 11/14 403/56 |
| 2,752,116 | A * | 6/1956 | Minnis | F16M 11/14 248/181.1 |
| 4,214,724 | A * | 7/1980 | Geiger | F16M 11/14 248/167 |
| 4,974,802 | A * | 12/1990 | Hendren | F16C 11/106 248/181.1 |
| 6,379,073 | B1 * | 4/2002 | Yoo | F16C 11/106 248/288.31 |
| 2013/0163978 | A1 * | 6/2013 | Carlesso | F16M 11/14 396/428 |

* cited by examiner

*Primary Examiner* — Roberto Velez
*Assistant Examiner* — Quan Pham
(74) *Attorney, Agent, or Firm* — Boyle Fredrickson, S.C.

(57) ABSTRACT

A directionally adjustable mounting device is disclosed for use with a small electronic device such as a wireless camera. Also disclosed is a method of using the mounting device. The mounting device has a mounting rod extending from a rotatable bearing. The hearing is biased into frictional contact with a socket by a spring to inhibit movement of the camera relative to the mount housing. The mount is configured to receive an opposing force on the bearing to overcome the spring force and allow the electronic device to be repositioned.

18 Claims, 6 Drawing Sheets

ELECTRONIC DEVICE MOUNT

BACKGROUND OF THE INVENTION

1. Field of the Invention

The invention relates generally to a mounting apparatus for an electronic device, and more particularly, relates to a mounting apparatus for supporting a directionally adjustable electronic device such as a wireless camera. The invention additionally relates to a method of using the same.

2. Discussion of the Related Art

As the market for small electronic devices has continued to expand, the availability and accessibility of cameras has similarly experienced growth. The camera industry has experienced significant expansion as a result of the improvement of digital photography, and the introduction of high quality digital image sensors into a growing field of small electronic devices, such as webcams, wireless network compatible cameras, handheld camcorders, action cameras, etc. These various cameras have become increasingly commonplace, largely driven by their flexibility and general ease of use.

For example, wireless network compatible cameras often are used for a variety of purposes including home security, business security, child monitoring, pet monitoring, etc. Additionally, many of these cameras offer beneficial features such as night vision through the use of infrared LEDs, high definition widescreen video, digital zoom, motion detection, audio alerts, etc.

Despite the many various uses for these electric devices, such as wireless network compatible cameras, one common need is the ability to mount the device in a desired location. That is to say, in remote monitoring systems of various types, including those that employ small cameras, it is a general need and desire to mount the camera to a support surface. For example, in the context of an exterior security system, there is a need to mount one or more cameras around the perimeter of a building or property in order to permit monitoring of the building's or property's perimeter.

However, despite the teed to mount a small camera in a desired location and position, there remains a need and desire to allow for adjustments to the mounting positions of the camera. For example, when a small camera is employed in the context of an exterior security system, it is often desirable to be able to adjust the camera's angular orientation side-to-side ("panning"), and/or up and down ("tilting") so that it is directed or "aimed" at a specific area of interest, such as a doorway. This directional adjustability can be particularly beneficial in the context of small cameras that are installed directly by the end user, and not a security system professional, and that may require various positional adjustments in order to obtain the desired camera field of view. Thus, there is need and desire to provide a camera mount that allows for ease of directional adjustability.

Typical adjustable mounts for small cameras include a clamp that holds the camera in place and that can loosened to adjust the camera's angular orientation and then retightened. A common type of mount includes a ball and joint style bracket that is bolted or otherwise affixed to the camera. In order to lock a camera having this style of mounting device in a desired orientation, a threaded bolt is often tightened to frictionally clamp the ball in position when the camera is in the desired angular orientation. This style of mount requires two hands to adjust the earned position: a first hand to hold the camera in the desired position, and a second hand to tighten the clamp. Similarly, repositioning of the camera also requires the use of two hands. Repositioning also is a time consuming process, requiring the mounting lock to be released, the camera to be repositioned, and the mounting clamp to be reengaged in sequence.

Furthermore, tightening the clamp of such a mechanism may unintentionally move the camera. As a result, the angular orientation of the camera may be skewed from its desired orientation, requiring re-adjustment.

In light of the foregoing, a camera mount that exhibits both secure camera position retention and an ease of camera angular position adjustability is desired.

Also, a method of using a camera mounting system that exhibits both secure camera position retention and an ease of camera angular position adjustability is also desired.

SUMMARY OF THE INVENTION

One or more of the above-identified needs are met by a directionally adjustable electronic device mounting device including a housing that defines an internal socket and a front aperture. A bearing is at least partially received within the socket, of the housing so, as to protrude forwardly from the socket. A mounting device, such as a threaded rod, is attached to the bearing and extends forwardly from the housing for receiving an electronic device, such as a camera. A spring is located within the housing and is configured to bias the hearing into frictional engagement with the socket with sufficient force to inhibit movement of the mounting device, relative to the socket when an electronic device is received on the mounting device. The hearing is moveable rearwardly out of contact with the socket to permit angular repositioning of the bearing and the mounting device (and thus the electronic device) relative to the housing upon imposition of opposing force on the bearing of sufficient magnitude to overcome the biasing force imposed by the spring.

In one embodiment, the socket comprises a curved annular surface adjacent the aperture of the housing and configured to receive a curved surface of the bearing.

In one embodiment, the maximum inner diameter of the curved, annular surface is less than the maximum diameter of the bearing.

In one embodiment, the electronic device is a wireless camera.

In accordance with another aspect of the invention, a method of mounting an electronic device such as a wireless camera is provided. The method includes affixing a mount housing to a supporting surface with a bearing being located in the housing and being biased into frictional engagement with a socket via a spring, thereby inhibiting rotation of the bearing relative to the socket. The method also includes affixing an electronic device to a mounting device that is supported on and that moves with the bearing. Subsequent actions include forcing the electronic device and bearing toward the housing against the biasing force of the spring, thereby releasing the bearing from engagement with the socket and, while the bearing is released from the socket, altering an angular orientation of the electronic device and the bearing relative to the socket. The method further includes subsequently releasing the electronic device and allowing the biasing force of the spring to force the bearing back into frictional engagement socket, thereby inhibiting rotational movement of the bearing relative to the socket and retaining the electronic device in its new position.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of electronic devices could be used with a mounting device in accordance with the invention as defined by the claims. Hence, while the preferred embodiments of the invention will now be described with reference to mounting a battery-powered camera for use with a wireless monitoring network, it should be understood that the invention is in no way so limited.

Figure 1:
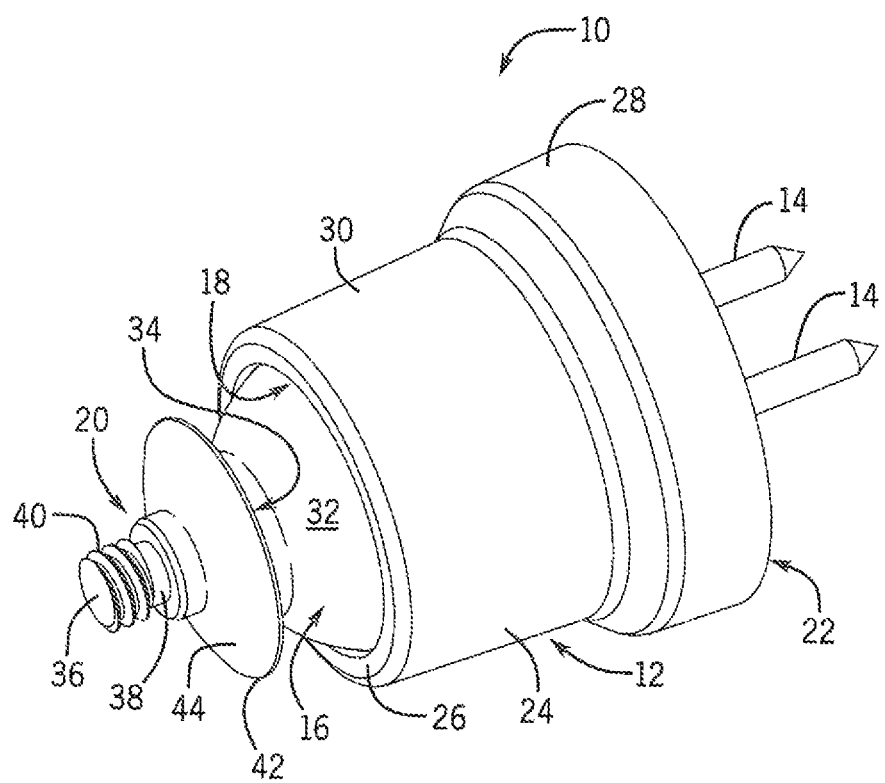
FIG. 1 is a front isometric view of an electronic device mount device constructed in accordance with an embodiment of the present invention.
Figure 7:
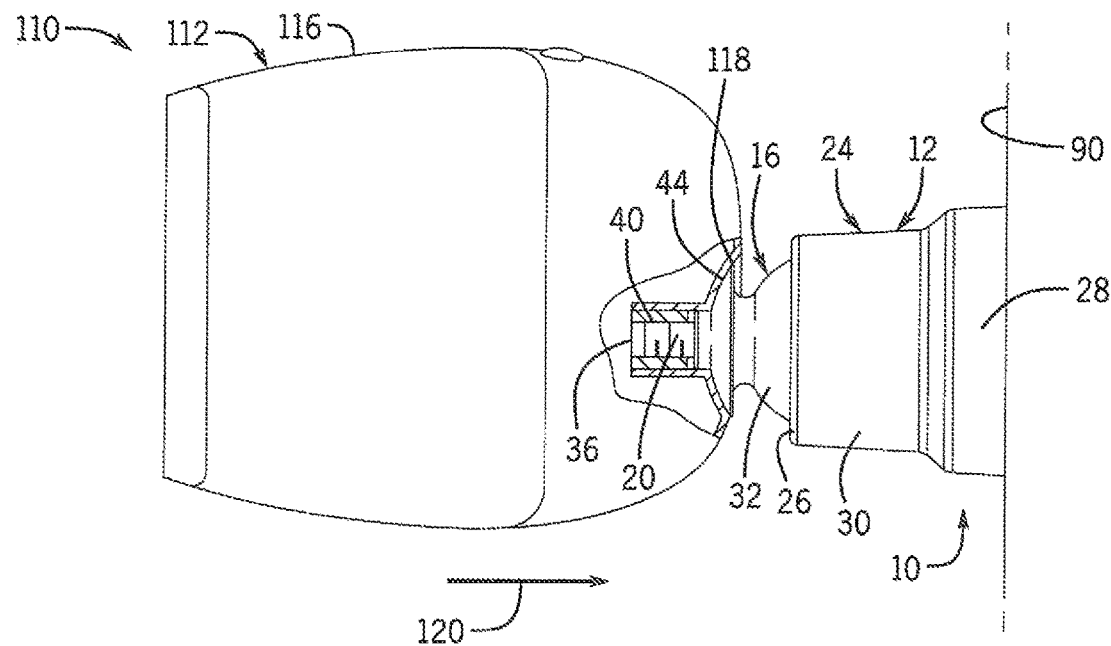
FIG. 7 is a side elevation view of the camera and mount of FIG. 6, showing the camera in a first angular orientation thereof relative to the camera mounting device.
Figure 8:
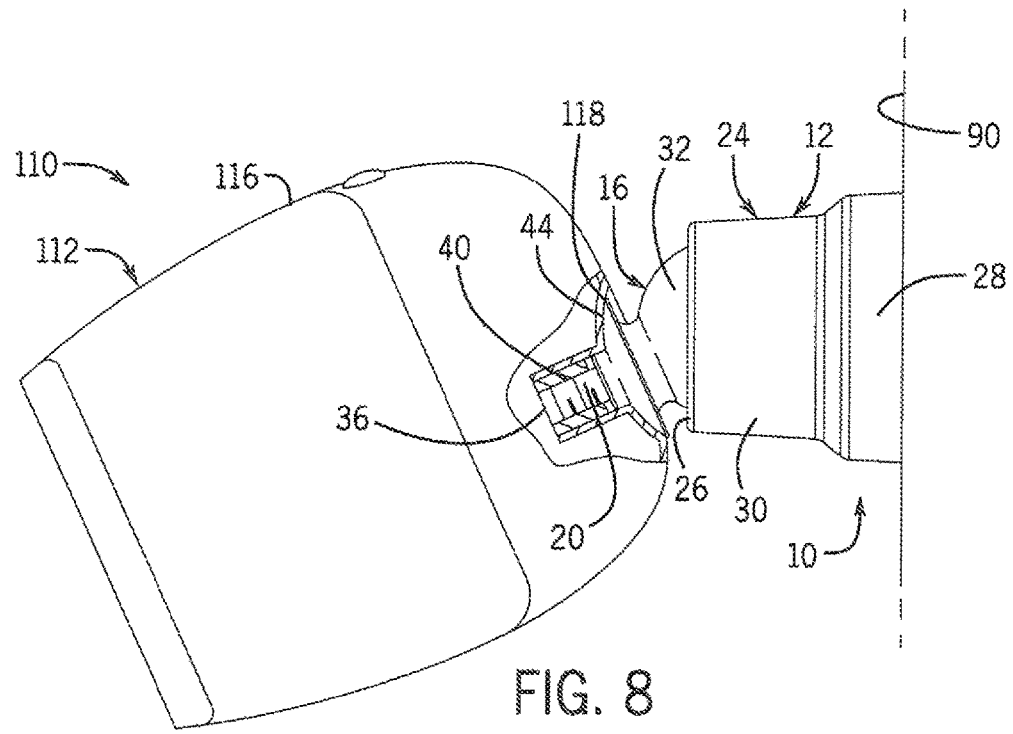
FIG. 8 is a side elevation view of the camera and mount of FIG. 6, showing the camera in a second angular orientation thereof relative to the camera mounting device.

FIG. 1 is an isometric view of a directionally adjustable mounting device 10, i.e., mount, constructed in accordance with one embodiment of the present invention. Referring briefly to FIGS. 7 and 8, the mount 10 supports a camera 110 in a manner that permits the camera 110 to be securely retained in a desired angular orientation relative to an underlying support surface 90 and to permit the camera 110 to be angularly repositioned (panned and/or tilted) to a different angular orientation and to be retained in the new position without having to loosen any clamps or the like.

Figure 2:
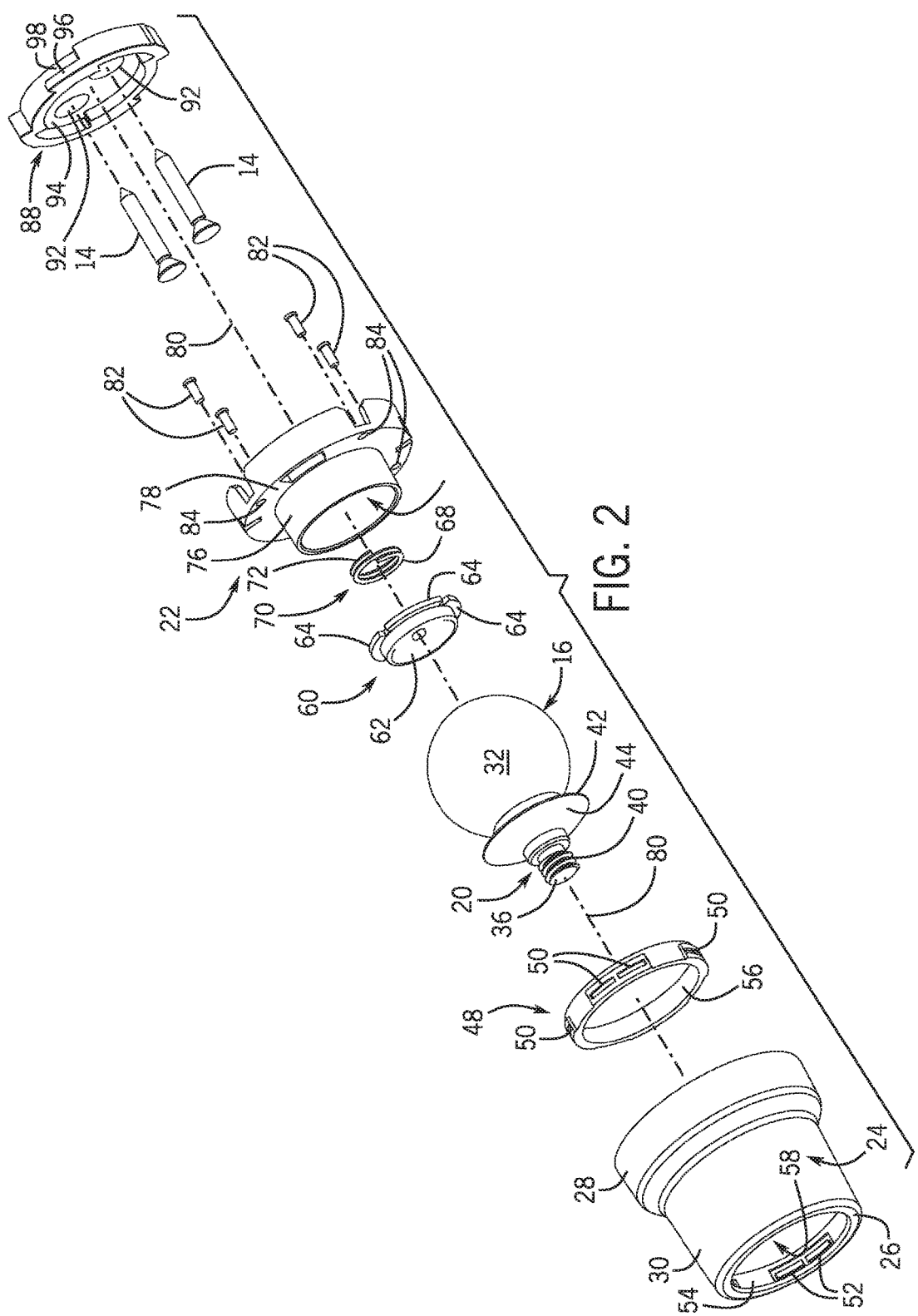
FIG. 2 is a exploded front isometric view of the mount device of FIG. 1.

Referring to FIGS. 1 and 2, the mount 10 includes a housing 12, a mounting fixture 88, a bearing 16 located partially within the housing 12 and protruding from an open front end or front aperture 18 of the housing 12, and a mounting device 20 extending forwardly from the bearing 16. The housing 12 of mount 10 includes a rear base 22 and a front cylindrical body 24 mounted on the base 22 and terminating at a front end 26. Housing body 24 is axially stepped to as to have a relatively large diameter rear end portion 28 a relatively small diameter front end second portion 30 terminating at the front end 26, as shown in FIG. 1. The mounting fixture 88 can be mounted on a support surface 90 such as a post of a fence or a wall of a building by fasteners 14 such a screws or nails The housing 12 is removably attachable to the mounting fixture 88, possibly without the use of tools.

Still referring to FIGS. 1 and 2, the bearing 16 is designed to frictionally engage an internal socket 56 under the biasing force of an internal spring 70 with sufficient force to securely hold a camera in position relative to the body 24 and to be releasable from the socket 56 when the bearing 16 is forced rearwardly of the socket 56. The bearing 16 of this embodiment is a substantially spherical ball that is rotatable within the housing 12. The mounting device 10 comprises a threaded rod 20 that extends forwardly from a front portion of the surface 32 of the bearing 16 that protrudes from the aperture 18. The portion of the illustrated mounting rod 20 that protrudes forwardly from the bearing 16 has a first or rear end 34, a second or front end 36 opposite the first end 34, and an, intermediate portion 38 extending between the first and second ends 34, 36. The second end 36 is configured to receive and engage a small electronic device thereon, for example, a wireless camera 112. A threaded portion 40 of the intermediate portion 38 adjacent the second end 36 may allow a small electronic device to be affixed to the mounting rod 20, as shown in FIGS. 7 and 8. However, the present invention is not so limited, and any alternative fixation devices are considered well within the scope of the present invention.

Referring to FIGS. 1, 7, and 8, a flange 42, possibly formed integrally with the bearing 16, circumscribes the intermediate portion 38 of the mounting rod 20. The flange 42 may have a front surface 44 that is configured to engage a similarly-shaped rear surface of the housing of an associated camera 12 or other small electronic device. In one embodiment of the present invention, the front surface 44 of the flange 42 is convex so as to mesh with a complimentary concave rear surface of the small electronic device housing. The flange 42 may form a weather-tight seal to the housing of the small electronic device as to limit exposure of the threaded portion 40 to atmosphere.

Referring to FIG. 2, the mount 10 constructed in accordance with one embodiment of the present invention is shown in an exploded view. As shown in FIG. 2, the housing 12 may be formed of multiple discrete components, including the rear base 22 and the front body 24. A ring 48 is configured to be inserted into the body 24 of the housing 12. A plurality of tabs 50, located along the outer peripheral surface of the ring 48, are configured to engage corresponding tabs 52 located along the inner peripheral side wall 54 of the body 24, adjacent the front end 28 of the body 24. Frictional engagement between the tabs 50, 52 retains the ring 48 in its desired location adjacent the end 28 of the housing body 24, and along the inner side wall 54 of the body 24. In this configuration, an inner, annular surface 56 of the ring 48 circumscribes the circumference of the aperture 18 of the housing body 24. As will be described in further detail below, the inner annular surface 56 of the ring 48 acts as the aforementioned socket by receiving the surface 32 of the bearing 16 when the mount 10 is assembled. In one embodiment of the present invention, the inner annular surface 56 may also be curved downwardly and outwardly so as to provide an increased surface area for contact with the outer surface 32 of the bearing 16.

Figure 3:
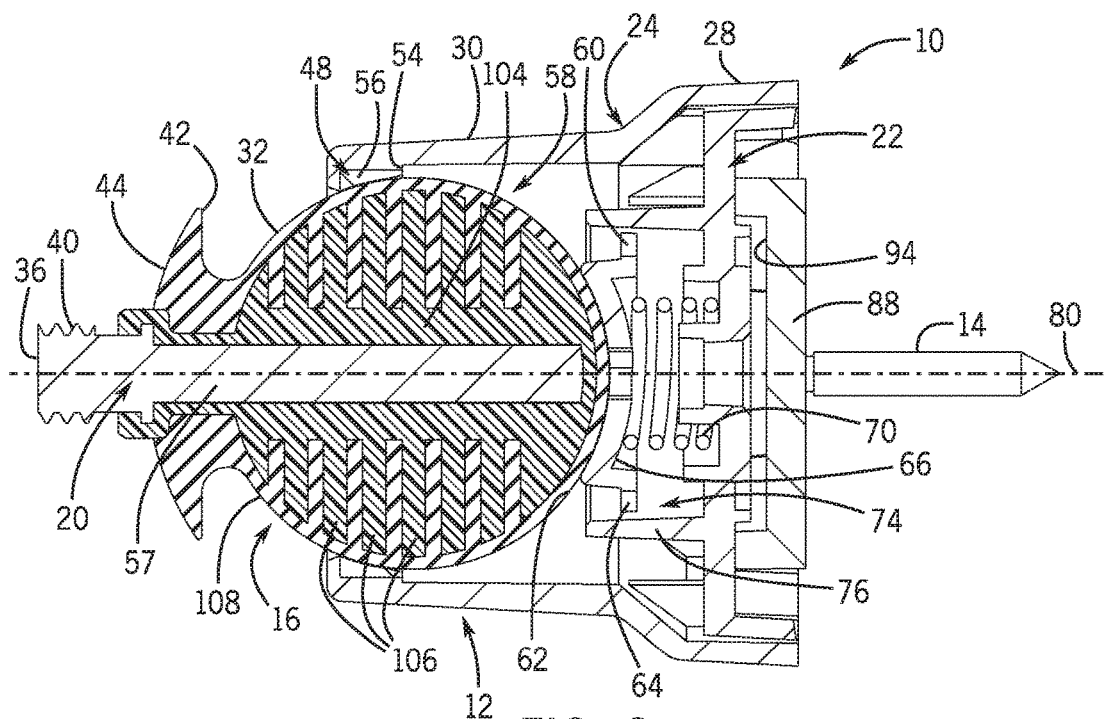
FIG. 3 is a side elevation cross-sectional view of the mount device of FIG. 1, showing a bearing of the device engaging a socket.
Figure 4:
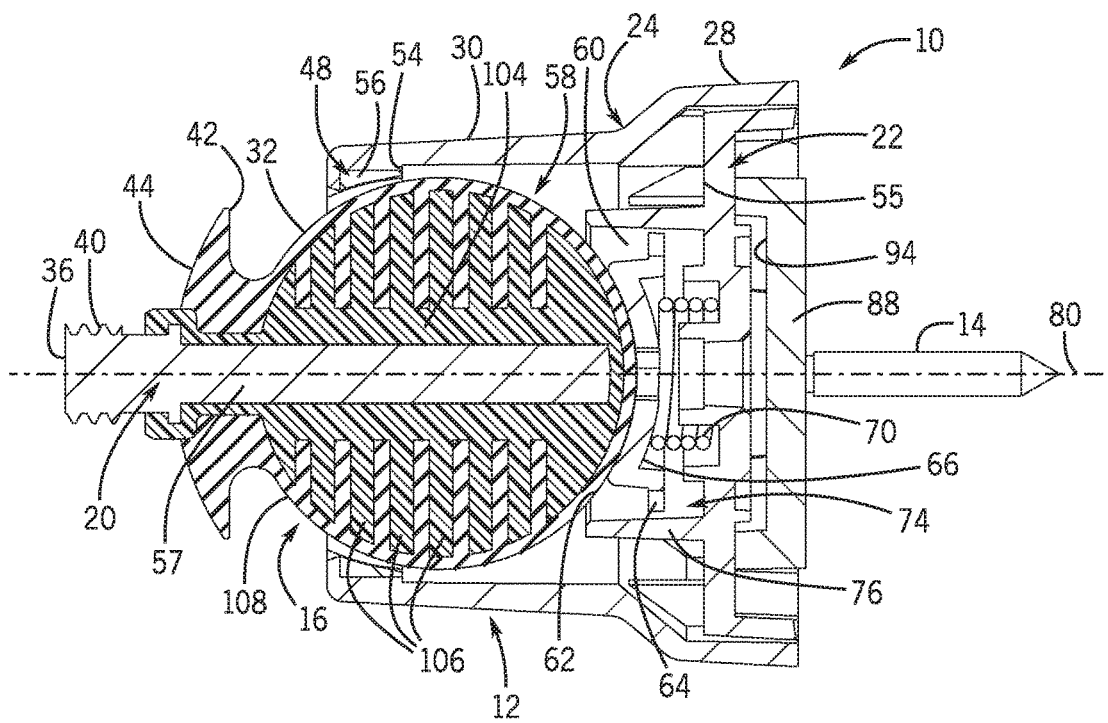
FIG. 4 is a side elevation cross-sectional view of the mount device of FIG. 1, showing the bearing disengaged from the socket.

Referring to FIGS. 2-4, the inner side wall 54 of the housing body 24 defines a hollow receptacle 58 extending along the length of the housing body 24. The receptacle 58 is configured to receive and retain the bearing 16, as well as the spring 70 and the ball seat 60, detailed below.

Still referring to FIGS. 2-4, the rear pole of the bearing 16, generally opposite mounting rod 20, is supported on an axially-movable seat 60. The seat 60 is generally disk shaped and comprises a concave front surface 62, one or more circumferentially-spaced protrusions 64 extending outwardly from the peripheral edge of the seat 60, and a rear spring receiving surface 66 (not shown in FIG. 2). The spring receiving surface 66 is configured to receive a front end 68 of the helical compression spring 70, which is positioned between the movable seat 60 and the fixed base 22 of the housing body 24. A second end 72 of the spring 70 thus engages the base 22. Compression of the spring 70 exerts a biasing force on the seat 60, which is translated to the bearing 16 via, the concave front surface 62 of the seat 60, as will be described in further detail below. This biasing force biases the outer surface 32 of the bearing 16 into frictional engagement with the inner annular surface 56 of the ring 48 in the absence of an opposing force.

Still referring the FIGS. 2-4, the seat 60 and the spring 70 are both received within a seat retaining void 74 defined by a tubular seat retention wall 76 extending forward from an inner wall 78 of the removable base 22. The inner diameter of the seat retaining void 74 is sized to receive the seat 60 therein, such that the circumferentially-spaced protrusions 64 extending outwardly from the peripheral edge of the seat 60 may engage the inner peripheral surface of the seat retention wall 76, as to prevent the seat 60 from becoming askew or misaligned. The retention wall 76 thus constrains motion of the seat 60 to linear axial motion.

With the seat 60 and spring 70 received within the seat retaining void 74, the base 22 may be received within the rear end portion 28 of the housing body 24. The base 22 may be affixed to the housing body 24 via one or more fasteners 82. The fasteners 82 may be inserted into corresponding holes 84 in base 22 and into fastening engagement with mating holes (not shown) in the inner or rear wall 55 of the body 24. Fasteners 82 may comprise screws, rivets, adhesive, or any other suitable fasteners.

Once the base 22 has been affixed to the body 24, the base 22 is not movable relative to the body 24. In this assembled configuration, the second end 72 of the spring 70 engages the base 22 at a fixed position relative to the housing 12, such that only the opposed front end 68 of the spring 70 is movable upon receiving an opposing force opposite that of the biasing force generated by precompression of the spring 70.

Still referring to FIGS. 2-4, the mounting fixture 88 of this embodiment comprises a generally cylindrical mounting plate. Mounting plate 88 can be mounted on a support surface 90 with fasteners such as screws or nails that pass through corresponding holes 92 in the mounting plate 88 and that are driven into the support surface 90 until the mounting plate 88 is securely affixed to the support surface 90. Any exposed ends of the fasteners 14 are flush set or recessed relative to the exposed surface 94 of the mounting plate 88 at that time.

When the housing 12 is assembled according to the preceding discussion, the rearward facing outer wall 86 of the base 22 will be exposed at the back of the housing 12, forming a receptacle therebehind for receiving the mounting plate 88. At least one tab 96 and channel 98 are disposed about the periphery of the mounting plate 88 and are configured to engage at least one corresponding tab and channel located about the periphery of the exposed outer wall 86 of the base 22. The housing 12 thus may be inserted over the mounting plate 88 and twisted relative to the mounting plate 88 to rotate the respective one or more tabs 96 and channels 98 of the mounting plate 88 into their counterparts in the exposed outer wall 86 of the base 22, thus fixing the housing 12 to the pre-installed mounting plate 88.

Turning now to FIGS. 3 and 4, mount 10 is shown in cross-sectional view. As shown in FIG. 3, the spring 70 is expanded to force the substantially spherical bearing 16 into frictional engagement with the inner annular surface 56 of the ring 48. In one preferred embodiment of the present invention, the spring force, in its pre-stressed state shown in FIG. 3, may have a magnitude of preferably approximately 1.0 kgf to 5.0 kgf, and more typically approximately a magnitude of 2.5 kgf. Rotation of the bearing 16 is inhibited at this time due to the frictional force between the annular surface 56 and the outer surface 32 of the bearing 16. In one embodiment of the present invention, the force required to rotate the stationary bearing 16 when it is seated against the annular surface 56, i.e., without first disengaging the bearing 16 from the socket formed by the annular surface 56, may have a magnitude of approximately 3.0 kgf to 10.0 kgf, and more typically approximately a magnitude of 6.0 kgf, when the force is applied to the second end 36 of the mounting rod.

In one preferred embodiment of the present invention, the outer surface 32 of the bearing 16 and the annular surface 56 forming the socket may each be formed of a rubberized material, such as thermoplastic urethane, having a relatively high coefficient of static friction. When the bearing 16 is seated on the socket 56, the annular surface 56 and the outer surface 32 of the bearing 16 may engage one-another with a coefficient of static friction of approximately 1.0 to 1.25, and more typically of approximately 1.16.

As mentioned briefly above and shown in FIG. 3, the inner annular surface 56 of ring 48 is a curved surface that is configured to receive a portion of the outer surface 32 of the substantially spherical bearing 16 therein. In one embodiment of the present invention, the arc length of the inner annular surface 56 is substantially equal to a corresponding arc length of the substantially spherical bearing 16, when the arc angle of the inner annular surface 56 is substantially equal to the arc angle of the substantially spherical bearing 16. Hence, the outer surface 32 of the bearing 16 and the annular surface 56 of the ring 48 have at least substantially the same curvatures throughout an area of mutual contact. The maximum diameter of the surface 56 is considerably smaller than the maximum diameter of the surface 32. The bearing 16 thus cannot be forced through the ring 48 and "pop out" of the housing 12 through the front opening 18.

Figure 5:
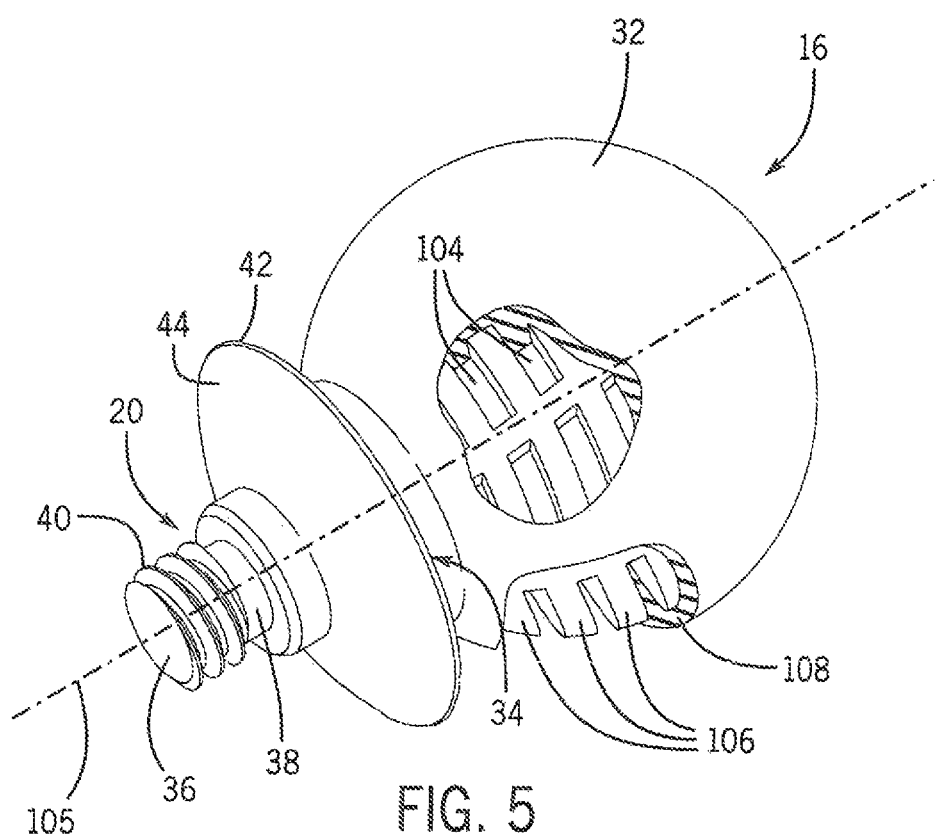
FIG. 5 is a partially cut-away font isometric view of the bearing of the mount device of FIG. 1, including cut away portions of the outer surface of the bearing.
Figure 6:
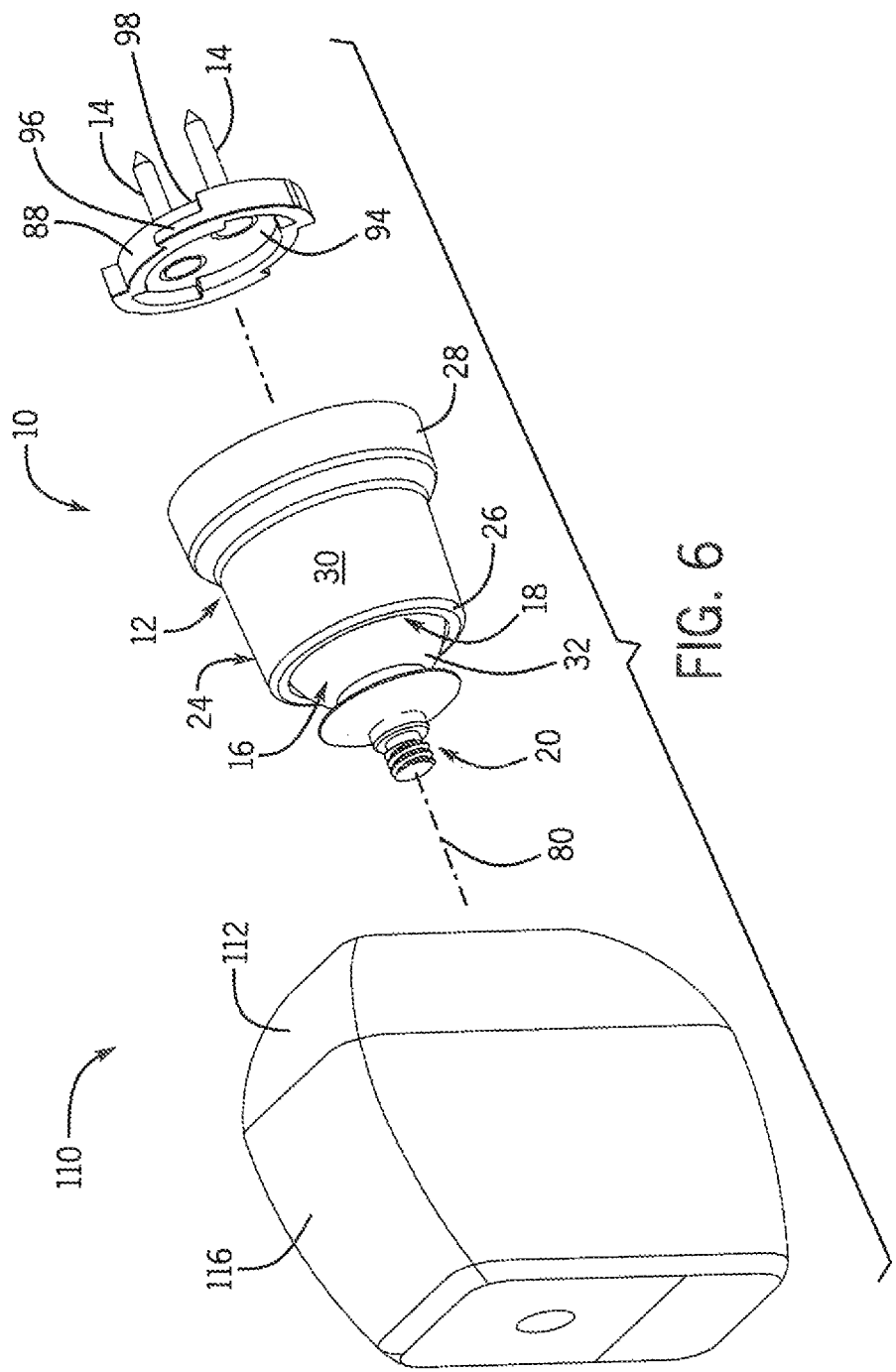
FIG. 6 is a partial exploded front isometric view of a camera and the mount of FIG. 1.

Still referring to FIG. 3, the mounting rod 20 is shown as having a rear end portion 57 extending into a core 104 of the substantially spherical bearing 16 and extending along a central longitudinal axis 105 of the bearing 16 (FIG. 6). Mounting rod 20 may be formed, for example, from steel or an injection molded plastic. In one embodiment of the present invention, the rear end portion 57 of mounting rod 20 is insert-molded to the core 104. Core 104 may be formed of a polycarbonate molded plastic, and may include a plurality of blades 106 extending outwardly from the central longitudinal axis 105 of the bearing 16. One or more knurls along the length of the rear end portion 57 of the mounting rod 20 may further affix the rod 20 to the core 104 of the bearing 16. An outer shell 108, formed of thermoplastic urethane discussed above, is then molded over the outer surface of the core 104 and mounting rod 20 to form the substantially spherical bearing 16 and its outer surface 32 and to form the flange 42. The resulting subassembly is shown in FIG. 5.

In contrast to FIG. 3, FIG. 4 illustrates mount 10 in a state in which an opposing force has been applied to the outer surface 32 of the substantially spherical bearing 16 of sufficient magnitude to overcome the biasing force of the spring 70 to force the bearing 16 rearwardly away from the annular surface 56. In one preferred embodiment of the present invention, the bearing 16 may be depressed a distance of preferably approximately 1 mm to 4 mm, and more typically of approximately a distance of 1.5 min. Since the bearing 16 is now out of contact with the socket formed by the annular surface 56, the bearing 16 and mounting rod 20 can be freely rotated within the housing 12 in order to adjust the angular orientation of the mounting rod 20 and any device mounted on it relative to the housing 12.

Turning now to FIGS. 6-8, and initially FIG. 6, a mounted camera system 110 is shown in which a battery-powered wireless camera 112 is received at the second end 36 of the protruding portion of the mounting rod 20. As shown in the partial cross-section views of FIGS. 7 and 8, the threaded portion 40 of the mounting rod 20 is received within a corresponding threaded portion 114 of a housing 116 of the camera 112, and the front surface 44 of the flange 42 has engaged a complimentary-shaped portion 118 of camera housing 116, such that the camera 112 is securely affixed to the mount 10 in FIG. 7. The longitudinal axis 80 of the bearing and mounting rod 20 is shown to lie along the longitudinal axis 80 of the mount 10, such that the mounting rod 20 is generally centrally located within the aperture 18 of the housing body 24. In this configuration, the camera 112 is securely retained in the illustrated angular orientation due to the frictional force exhibited between the annular surface 56 of the ring 48 and the outer surface 32 of the bearing 16.

In contrast, FIG. 8 shows the longitudinal axis 105 of the mounting rod 20 to lie at an angle relative to the longitudinal axis 80 of the mount 10, such that the mounting rod 20 is not generally centrally located within the aperture 18 of the housing body 24. As such, FIG. 8 may represent an alternative desired camera placement in which the inclination of the camera 112 is markedly different from that illustrated in FIG. 7.

In accordance with one embodiment of the present invention, the range of arcuate, adjustment of the mounting rod 20 and thus of the camera, or other device mounted on it may be more than 45° and more preferably approximately 75° or more relative to the longitudinal axis 108 of the mount 10.

In order to move the camera 112 from the position illustrated, in FIG. 7 to the position illustrated in FIG. 8, the user need only exert an opposing force on the camera 112 in the direction of arrow 120 in FIG. 7 that is opposite the biasing force of the spring 70 and of a magnitude sufficient to overcome the biasing force, thus unseating the bearing 16 from the socket 56. The user then pivots the camera 112 to the desired new angular orientation of FIG. 8, with resulting rotation of the bearing 16, and releases the camera 112, whereupon the spring 70 will again force the outer surface 32 of the bearing 16 into firm frictional engagement with the annular surface 56 of the ring 48 to maintain the camera 112 in the modified angular orientation.

It is contemplated that an alternative embodiment may incorporate any of the features of the previous embodiment described above.

Many other changes and modifications could be made to the invention without departing from the spirit thereof.

I claim:

1. A directionally adjustable mounting device for an electronic device, comprising:
   a housing having a socket and a front aperture;
   a rotatable bearing at least partially received within the socket of the housing;
   a mounting device extending forwardly from and affixed to the bearing, for supporting an electronics device;
   a spring disposed within the housing and configured to impose a biasing force on the bearing of sufficient magnitude to force the bearing into frictional engagement with the socket with sufficient force to inhibit movement of the mounting device when an electronic device is received on the mounting device;
   an axially movable seat disposed between the bearing and the spring; and
   a tubular seat retention wall that is sized to receive the seat therein such that circumferentially-spaced protrusions extending outwardly from a peripheral edge of the seat may engage an inner peripheral surface of the seat retention wall so as to maintain the seat in axial alignment with the seat retention wall, and wherein the mounting device is configured such that the seat can move axially freely relative to the seat retention wall in the absence of a biasing force of the spring;
   wherein the bearing is moveable rearwardly out of contact with the socket to permit angular repositioning of the bearing and the mounting device relative to the housing upon imposition of an opposing force on the bearing that is opposite the biasing force imposed on the bearing by the spring and that is of sufficient magnitude to overcome the biasing force imposed by the spring.

2. The directionally adjustable mounting device of claim 1, wherein the socket comprises an annular surface adjacent the front aperture of the housing.

3. The directionally adjustable mounting device of claim 2, wherein the bearing has a substantially spherical outer surface that engages the annular surface.

4. The directionally adjustable mounting device of claim 3, wherein the annular surface is semi-spherical.

5. The directionally adjustable mounting device of claim 3, wherein the bearing and the annular surface have at least substantially the same curvatures throughout an area of mutual contact.

6. The directionally adjustable mounting device of claim 3, wherein a maximum inner diameter of the annular surface is less than a maximum diameter of the bearing.

7. The directionally adjustable mounting device of claim 3, wherein the biasing force imposed by the spring generates a frictional force between the outer surface of the bearing and the annular surface of sufficient magnitude to inhibit movement of the mounting device when an electronic device is received on the mounting device.

8. The directionally adjustable mounting device of claim 1, wherein the axially movable seat comprises a first surface configured to engage a first end of the spring and a second, opposing surface configured to receive a rear end portion of the bearing therein.

9. The directionally adjustable mounting device of claim 1, wherein a second end of the spring engages a housing end wall, and wherein the housing end wall is located substantially opposite the front aperture of the housing.

10. The directionally adjustable mounting device of claim 9, further comprising a mounting fixture removably-attached to the housing wall and configured for attachment to a support.

11. The directionally adjustable mounting device of claim 1, wherein the mounting device comprises a rod having a threaded shaft configured to engage a corresponding threaded opening in the electronic device.

12. The directionally adjustable mounting device of claim 11, wherein the rod is circumscribed by a flange configured to engage a surface of the electronic device.

13. The directionally adjustable mounting device of claim 1, wherein the electronic device is a camera.

14. A directionally adjustable mounted camera system, comprising:
   a camera having a camera housing having a threaded opening formed therein;
   a mounting rod having a threaded first end received within the threaded opening of the camera housing;
   a substantially spherical ball affixed to a second end of the mounting rod and being rotatable relative to the housing;
   a camera mount housing defining a socket configured to receive the ball therein, and further defining an aperture located at a front end of the housing, wherein the ball protrudes forwardly from the socket;
   a spring disposed within the housing having a first end and a second end, the first end of the spring is configured to exert a biasing force on the ball that generates a frictional engagement force between the ball and the socket that is of sufficient magnitude to inhibit movement of the mounting rod and camera;
   an axially movable seat disposed between the bearing and the spring; and
   a tubular seat retention wall that is sized to receive the seat therein such that circumferentially-spaced protrusions extending outwardly from a peripheral edge of the seat may engage an inner peripheral surface of the seat retention wall so as to maintain the seat in axial alignment with the seat retention wall, and wherein the mounting device is configured such that the seat can move axially freely relative to the seat retention wall in the absence of a biasing force of the spring; and wherein the ball is moveable rearwardly out of contact with the socket to permit angular repositioning of the ball and the camera relative to the housing upon imposition of an opposing force on the ball that is opposite the biasing force of the spring and that is of sufficient magnitude to overcome the biasing force imposed by the spring.

15. The directionally adjustable mounted camera system of claim 14, wherein a maximum inner diameter of the socket is less than a maximum outer diameter of the bearing.

16. The directionally adjustable mounted camera system of claim 14, further comprising a mounting fixture removably affixed to the housing and configured for attachment to a support.

17. A method of mounting an electronic device on a support, comprising the steps of:
   affixing a mount housing to a supporting surface, a bearing being mounted in and rotatable relative to the housing and being biased into frictional engagement with a socket via a biasing force exerted by a spring on an axially movable seat disposed between the bearing and the spring, thereby inhibiting rotation of the bearing relative to the socket;
   wherein the housing comprises a tubular seat retention wall that is sized to receive the seat therein such that circumferentially-spaced protrusions extending outwardly from a peripheral edge of the seat may engage an inner peripheral surface of the seat retention wall so as to maintain the seat in axial alignment with the seat retention wall, and wherein the mounting device is configured such that the seat can move axially freely relative to the seat retention wall in the absence of a biasing force of the spring;
   affixing an electronic device to a mounting device that is supported on and that moves with the bearing;
   applying a force on the electronic device and the bearing toward the housing against the biasing force of the spring, thereby disengaging the bearing from the socket;
   while maintaining the applied force on the bearing that is released from the socket, altering an angle of the applied force as to alter an angular orientation of the electronic device and the bearing relative to the socket; then
   releasing the electronic device and the bearing and allowing the biasing force of the spring to force the bearing back into frictional engagement with the socket and to maintain the angular orientation of the bearing in its then-present state unless and until the bearing is again forced away from the socket against the biasing force of the spring.

18. The method of claim 17, wherein the electronic device comprises a camera.

* * * * *